United States Patent [19]

Cooper et al.

[11] 4,088,634
[45] May 9, 1978

[54] PROCESS FOR ISOLATION AND PURIFICATION OF POLYPHENYLENE ETHERS

[75] Inventors: Glenn Dale Cooper, Delmar; James Wilson Watson, Jr., New City, both of N.Y.

[73] Assignee: General Electric Company, Pittsfield, Mass.

[21] Appl. No.: 748,741

[22] Filed: Dec. 9, 1976

[51] Int. Cl.² .................. C08G 65/44; C08G 65/45
[52] U.S. Cl. .................................................. 260/47 ET
[58] Field of Search .................................. 260/47 ET

[56] References Cited

U.S. PATENT DOCUMENTS 3,236,807  2/1966  Stamatoff .............................. 260/47
3,383,361  5/1968  Meijs et al. .......................... 260/47

Primary Examiner—Lester L. Lee
Attorney, Agent, or Firm—Morgan, Finnegan, Pine, Foley & Lee

[57] ABSTRACT

A process for the recovery of polyphenylene ethers comprises precipitation with a "wet" acetone. In a preferred feature, the metallic catalyst from a polymerization mixture is simultaneously removed by use of a chelating agent.

21 Claims, No Drawings

PROCESS FOR ISOLATION AND PURIFICATION OF POLYPHENYLENE ETHERS

This invention provides a process for the recovery of polyphenylene ethers and for removal of the metallic catalyst from the mixtures in which polyphenylene ethers are formed.

BACKGROUND OF THE INVENTION

The polyphenylene ethers and processes for their preparation are known in the art and described in numerous publications including Hay, U.S. Pat. Nos. 3,306,874 and 3,306,875, both of which are hereby incorporated by reference. Other patents which show the preparation of polyphenylene ethers include Price et al, U.S. Pat. Nos. 3,382,212 and Kobayashi et al, 3,455,880, which are also incorporated by reference.

The processes most generally used to produce the polyphenylene ethers involve the self-condensation of a monovalent phenol in the presence of an oxygen-containing gas and a catalyst comprising a metal-amine complex.

These processes are run in the presence of an organic solvent and the reaction is usually terminated by removal of the catalyst from the reaction mixture. This has been done by the use of aqueous solutions of acetic acid, sulfuric acid, sodium bisulfate, chelating agents such as glycine, nitrilotriacetic acid and its sodium salts or ethylenediamine tetracetic acid and its sodium salts. The best prior art procedure for recovery of the polyphenylene ether itself is based on precipitation from the reaction mixture with an antisolvent, i.e., a liquid which is miscible with the reaction solvent but in which the polymer does not dissolve.

By way of illustration, in producing poly(2,6-dimethyl-1,4-phenylene ether), xylenol is oxidized in toluene solution and the polymer is precipitated by addition of methanol to the reaction mixture, after removal of the copper catalyst by extraction with acids or with complexing agents such as salts of ethylenediamine tetraacetic acid, and the like. The polymer is filtered off, washed and dried. Methanol and toluene are separated by adding water to the filtrate to produce a toluene phase and a methanol-water phase almost free of toluene; toluene and methanol are then recovered by distillation. A major cost of this process is due to the energy requirement for distillation of methanol from the methanol-water mixture.

It has now been discovered that the cost of anti-solvent recovery can be greatly reduced by precipitating with "wet" acetone rather than with methanol. The heat of vaporization of acetone is less than half that of methanol and, since acetone and toluene do not form an azeotrope, it is not necessary to separate them by addition of water; both can be recovered by fractional distillation of the filtrate. The energy required for recovery of acetone in this way is estimated to be approximately 40% of that required for an equal weight of methanol.

The improvement contemplated by this invention is unexpected because, although the use of acetone for precipitation of polyphenylene oxides has been reported, under the conditions previously used (less than 10% polymer concentration, precipitation with dry acetone) the recovery of polymer with acetone is significantly less than with methanol. Also, in prior instances, the catalyst was removed by extraction with strong acids such as hydrochloric acid. Such acids are known to cause condensation reactions of acetone and lead to loss of acetone and contamination of the solvent with undesirable condensation products such as mesityl oxide, phorone, and the like.

It has now been found that polymer recovery with acetone is essentially the same as with methanol when a small amount of water (3 to 15%) is added to the acetone and the polymer solution to be precipitated is moderately concentrated (e.g., 15% or more by weight). When the catalyst is removed without the use of strong acid or base, as by extraction with the trisodium salt of ethylenediaminetetraacetic acid, the acetone can be recovered by distillation of the filtrate without appreciable formation of condensation products. Physical properties of polyphenylene ether-polystyrene blends made from acetone-precipitated polymer are the same as those of blends made with methanol-precipitated polymer.

Accordingly, it is an object of this invention to provide an improved process for the preparation of a polyphenylene ether resin with the aim of obtaining a polyphenylene ether resin with a reduced amount of energy required in the recovery of the antisolvent.

This disclosure provides a further unexpected advantage, which is a preferred feature of the invention. In a process to make polyphenylene ethers, the reaction mixture in toluene at the end of polymerization, is stirred with an aqueous solution of a chelating agent, e.g., a salt of ethylenediaminetetraacetic acid (EDTA), usually the tri- or tetrasodium salt or of nitrilotriacetic acid, e.g., the disodium or trisodium salt of nitrilotriacetic acid (NTA), to form a chelated copper complex, and methanol containing a small amount of water is added to precipitate the polymer. See, e.g., Bennett and Copper, U.S. Pat. Nos. 3,838,102; and Floryan and Watson, 3,951,917, both of which are incorporated herein by reference. The chelated copper complexes are soluble in the methanol-water-toluene solution and polymer with low copper content is obtained by filtering off the precipitate and washing with methanol-water. The filtrate forms a single phase which contains all of the copper used in preparation of the polymer. Water is added to this filtrate to cause separation into two phases, one of toluene, and the other a mixture of methanol-water. Methanol is then recovered from the methanol-water phase by distillation. The methanol-water phase contains the chelated copper complex, which decomposes in the distilling column to form deposits of copper and copper oxides, so that the column must be shut down frequently for cleaning.

It has now been discovered that when "wet" acetone, e.g., acetone containing 3 to 15% of water, is used instead of methanol, the polymer may be precipitated and the copper separated from the solvent-antisolvent mixture in a single step. Unlike the toluene-methanol-water system, which remains homogeneous up to high water concentrations, small amounts of water in acetone-toluene forms a separate, largely aqueous phase. Since the chelate-copper complex and other salts derived from the catalyst are soluble in water but not in acetone-toluene, the copper is extracted into the aqueous phase. The aqueous solution can be separated by decanting the polymer suspension, by centrifuging the mixture, or simply by filtering the mixture and then separating the aqueous and non-aqueous phases of the filtrate before solvent recovery. More than 95% of the copper is easily removed in this way. If the copper content of the polymer obtained by simply filtering the mixture is higher than is desirable, it can be reduced to a low level by washing the powder with a small amount of methanol or water.

Therefore, it is also an object of this invention to simplify the preparation of polyphenylene ethers by reducing the number of process steps required to obtain the product free of catalyst residues, and at the same time, facilitating recovery of the antisolvent.

DESCRIPTION OF THE INVENTION

This invention provides in a process for forming a polyphenylene ether by an oxidative coupling reaction in the presence of a metal ion-amine complex catalyst comprising passing an oxygen containing gas through a reaction solution of a phenol and said metal ion amine catalyst, the improvement which comprises separating the polyphenylene ether by admixing said solution with a mixture of acetone and a minor proportion of water.

According to a preferred aspect of the present invention, the process will be carried out using a chelatable metal ion-amine complex catalyst in a solvent capable of liquid-liquid extraction with water and will also include terminating the reaction and separating the metal ion component of said catalyst by contacting the reaction solution with a chelating agent which is capable of forming a chelate with said metal ion, both the chelating agent and the chelate being soluble in water but insoluble in a mixture of acetone and said solvent prior to admixing said solution with said mixture of acetone and a minor proportion of water.

As has been mentioned above, the antisolvent used in this invention is "wet" acetone, i.e., acetone admixed with water, in which the acetone predominates. Up to 49% by weight of water can be present and down to about 3% of water can be present. Preferably, however, the water content will range from about 3 to about 25, and most preferably, from about 3 to about 15% by weight in the mixture of acetone and water.

In the preferred aspect, the chelating agent can be added in the form of an aqueous solution although this is not essential. If a dry solid is employed, the free water formed in the polyphenylene ether synthesis will ordinarily be sufficient to dissolve the salt.

A wide variety of chelating agents are effective in the preferred aspect present process. They may be organic as well as inorganic in nature. In general, however, the preferred agents will comprise a polyfunctional carboxylic acid containing compound, such as sodium potassium tartrate, nitrilotriacetic acid, citric acid, glycine and especially preferably, they will be selected from polyalkylenepolyamine polycarboxylic acids, aminopolycarboxylic acids, aminocarboxylic acids, polycarboxylic acids and their alkali metal, alkaline earth metal or mixed alkali metal-alkaline earth metal salts. Illustratively, the chelating agents will include ethylenediaminetetraacetic acid, hydroxyethylethylenediaminetriacetic acid, diethylenetraminepentaacetic acid or a mono-, di- or tri- and tetrasodium salt thereof, or of nitrilotriacetic acid, citric acid and glycine, and their corresponding salts.

The preferred salts of ethylenediaminetetraacetic acid are the di-, tri- and tetra-sodium salts. The preferred salt of nitrilotriacetic acid is the disodium salt. Usually, these salts are employed as a 1 to 50% by weight aqueous solution, and more preferably, a 10 to 40% by weight aqueous solution. The volume of such a solution to be used is selected so that a molar ratio of the salt to metal ion is in the range of 1:1 to 10:1 or more. The preferred range is 1:1 to 2:1.

Any conventional metal ion used in the past for forming the complex catalyst will be useful in the present invention. By way of illustration, it can comprise copper, manganese, cobalt, nickel, vanadium, chromium and salts thereof, but copper is preferred. Conventional components such as primary, secondary and tertiary amines are utilized.

The preferred polyphenylene ether is of the formula:

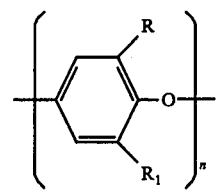

wherein the oxygen ether atom of one unit is connected to the benzene nucleus of the next adjoining unit, $n$ is an integer of at least 50; and R and $R_1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

The preferred polyphenylene ether is poly(2,6-dimethyl-1,4-phenylene)ether.

The polyphenylene ether-forming reaction can be carried out under a wide variety of well known process conditions. Merely by way of illustration, a copper halide can be mixed with an aliphatic amine in an aromatic solvent, then oxygen or an oxygen-containing gas can be introduced while the appropriate phenol is fed into the agitated reaction mixture at a moderate temperature, for example, in the range of 25° to 50° C. The degree of polymerization is primarily controlled by the reaction time, although catalyst activity, promoters, temperature, oxygen flow rate and other parameters have known effects. To save unnecessary explanation of those known process details, reference is made to the above-mentioned patents.

At the point where the polymerization reaction reaches the desired yield, the reaction solution will comprise a solution of polyphenylene ether, typically from 1 to 50% by weight and usually from 5 to 30% by weight, metal and amine, typically from about 0.005 to 1.5% by weight of metal and from about 0.5 to 2.0% by weight of amine and minor amounts of other materials, such as various promoters, byproducts, unreacted monomer, and the like. Such reaction solutions are then treated with the antisolvent and, optionally, with the chelating agents, in accordance with the present process.

As has been mentioned, an especially preferred method for carrying out the process of this invention is to employ a polyphenylene ether polymerization mixture having a high solids content. The term high solids is used herein to describe those polymerization mixtures having an excess of 15% by weight of solids. There is no known upper limit to the amount of solids but it appears that 50% by weight represents a practical upper limit that would be employed according to the present invention because above that amount, the solutions of polyphenylene ether resins become quite viscous.

The amount of "wet" acetone used as the antisolvent is not critical and from about 0.5 to 10 volumes of antisolvent per volume of reaction solution are conveniently employed.

The precipitated polyphenylene ether resins may be recovered by conventional methods and dried to form useful molding resins, alone or in admixture with other resins, e.g., styrene resins.

DESCRIPTION OF THE PREFERRED EMBODIMENTS

The following examples are for the purpose of illustration and are not to be construed as limiting the invention. Unless otherwise specified, the acetone-water and methanol-water solutions are parts or percentages by volumes. A mixture of 90 volumes of acetone and 10 volumes of water is about 12% water by weight.

EXAMPLE 1

(a) Preparation of Polyphenylene Ether Reaction Solution 2,6-xylenol is added over a period of 40 minutes to a rapidly stirred mixture of cupric chloride, sodium bromide and di-n-butyl amine in toluene, with oxygen introduced near the bottom of the reaction vessel. The xylenol added makes up 21% by weight of the total reaction mixture, and the molar ratio of xylenol: $CuCl_2$:NaBr: amine is 250:1:2:36. The temperature is maintained at 30° to 33° C. during the period of xylenol addition, then increased to 44° C. for the remainder of the reaction. After a total reaction time of 110 minutes, the mixture is diluted with toluene to a polymer concentration of approximately 15% and extracted with a 20% solution of the trisodium salt of ethylenediaminetetraacetic acid (1.1:1 ratio of complexing agent to copper).

(b) Precipitation of Polymer With "Wet" Acetone

A 50.00 gram portion of the reaction mixture described in (a) is vigorously stirred while 100 ml. of 95% acetone — 5% water, by volume, is added. The precipitated polymer is filtered on a tared filter, reslurried on the filter with 25 ml. of 95% acetone, and dried. The weight of polymer is 7.4636 g. For comparison purposes, a second portion of 50.00 grams is similarly precipitated and washed with 95% methanol — 5% water; the weight of polymer recovered is 7.4694 grams.

(c) Recovery of Acetone 100 grams of reaction mixture prepared as described in step (a) is precipitated by addition of 170 ml. of 90% acetone — 10% water, by volume. The polymer is filtered off and the filtrate is decanted from the small aqueous phase. It is heated under a reflux for three hours and then distilled through a short Vigreaux column until the overhead temperature reaches 64° C. No mesityl oxide or isophorone (possible condensation products of acetone) are detected by gas chromatography of the distillate or the residue in the pot. Furthermore, no impurities present in the filtrate from a sample similarly precipitated in methanol are observed.

EXAMPLE 2

(a) Preparation of Polyphenylene Ether Reaction Mixture 2,6-xylenol is oxidized in toluene solution using as catalyst a mixture of cupric chloride, sodium bromide, and di-n-butylamine. The xylenol is added to the mixture over a period of 45 minutes; the molar ratio of xylenol: $CuCl_2$:NaBr: amine is 250:1:2:36 and the xylenol makes up 20% by weight of the reaction mixture. After 120 minutes, the mixture is diluted with enough toluene to make the polymer concentration 16% by weight, and then thoroughly mixed with a 20% aqueous solution of the trisodium salt of ethylenediaminetetraacetic acid (1.1:1 ratio of complexing agents to copper).

(b) Separation of Copper With "Wet" Acetone

Four 50 gram portions of the mixture described in step (a) are weighed out and to each is added 85 ml. of one of the following mixtures: (1) 95% acetone — 5% water; (2) 90% acetone — 10% water; (3) 95% methanol — 5% water; (4) 90% methanol — 10% water. The two comparison mixtures using methanol consist of a polymer suspended in a single liquid phase; the mixture with "wet" acetone according to this invention contains a small dark blue-green lower phase in addition to the polymer suspension. A portion of the lower phase is drawn off for analysis and the remainder of the mixture is centrifuged, (as are the two mixtures with methanol), and a portion of the yellow organic phase is removed. Copper analyses of the organic and aqueous phases are shown below:

| Antisolvent Mixture | Cu in Organic Phase | Cu in Aqueous Phase |
| --- | --- | --- |
| (1) 95% Acetone - 5% Water | 6.6 ppm | 2.3% |
| (2) 90% Acetone - 10% Water | 4.5 ppm | 0.6% |
| (3) 95% Methanol - 5% Water | 160 ppm | — |
| (4) 90% Methanol - 10% Water | 160 ppm | — |

It is seen that most of the copper has been removed from the organic polymer-containing phase with "wet" acetone treatment according to this invention.

EXAMPLE 3

A 50 gram portion of the reaction mixture described in Example 2, step (a) is precipitated with 85 ml. of 90% acetone — 10% water and the polymer is filtered off and divided into four portions. One is dried without further treatment, and the others are reslurried in 95% acetone, water, or methanol, and filtered. Copper analysis of the polymers are as follows:

| Reslurry | Cu in Polymer (ppm) |
| --- | --- |
| None | 206 |
| 95% Acetone - 5% Water | 186 |
| Water alone | 43 |
| 95% Methanol - 5% Water | 9 |

It is seen that the present process produces polymer in a form from which the remaining copper can be easily separated with water or methanol.

EXAMPLE 4

Fifty gram portions of reaction mixture prepared as described in Example 2, step (a), are precipitated with 100 ml. of 95% acetone — 5% water. One of the mixtures is stirred vigorously to suspend the aqueous phase and quickly filtered and washed on the filter with 95% acetone. A second is precipitated with 95% acetone — 5% water, then stirred gently and the polymer suspension is decanted from the aqueous phase and filtered. The third is done in the same way, but the polymer is washed on the filter with acetone, followed by a small amount of water. For comparison purposes, one of the mixtures is precipitated with 95% methanol — 5% water, the polymer is reslurried in 95% methanol — 5% water and then washed on a filter with methanol.

Copper analyses of the polymers are as follows:

| Treatment | Cu in Polymer (ppm) |
|---|---|
| Acetone Precipitation, heavy phase suspended (this invention) | 1700 |
| Acetone Precipitation, decanted (this invention) | 175 |
| Acetone Precipitation, decanted, washed (this invention) | 28 |
| Methanol Precipitation (comparison) | 41 |

It is seen that a polymer of lower copper content can be produced using "wet" acetone according to this invention, using decantation and washing, than can be obtained with "wet" methanol.

EXAMPLE 5

Poly(2,6-dimethyl-1,4-phenylene)ether is prepared by oxidizing 106 parts by weight of 2,6-xylenol in 407 parts by weight of toluene, containing 17 parts by weight of di-n-butylamine, with oxygen gas, using a catalyst comprised of 0.44 parts cupric chloride: 0.68 parts of sodium bromide and 0.1 parts of trioctylmethylammonium chloride in 4.5 parts by weight of methanol (250:1:2 molar ratio of 2,6-xylenol: $CuCl_2$:NaBr). One hundred grams of the reaction mixture is stirred for five minutes in a high speed (Waring) blender with 7 ml. of a 0.75 molar solution in methanol of the dibutylamine salt of nitrilotriacetic acid (3 moles DBA/mole NTA) and the polymer is then precipitated with 170 ml. of 90% acetone (9 volumes acetone: 1 volume water). The polymer is filtered off, reslurried with 50 ml. of 90% acetone. The copper content of the polymer is only 6 ppm.

EXAMPLE 6

This example shows that the product obtained by precipitation with acetone gives properties equivalent to methanol-precipitated polymer when blended with polystyrene.

Three liters of a reaction mixture prepared as described in Example 2 and mixed with trisodium EDTA as described in Example 2 is precipitated by the addition of 5.1 liters of acetone containing 5% by weight of water. The precipitated polymer is filtered, dried, washed with 500 ml. of hot water (80° C.) and again filtered and dried. The dried polymer weighs 415 grams and contains 60 ppm of copper. This polymer is blended with 400 grams of Foster Grant 834 polystyrene (a high impact polystyrene containing approximately 8% polybutadiene rubber), 4 grams of tridecyl phosphite and 24 grams of triphenyl phosphate and extruded at 600° F. in a 28 mm twin-screw extruder. The extruded pellets are molded into standard test pieces on a 3 oz. screw injection molding machine. For comparison, a blend of the same proportions is extruded and molded using polyphenylene ether obtained from the same mixture by precipitation and washing with methanol containing 5% water. The properties of the blends are as follows:

| Polyphenylene Ether | Elongation (%) | Tensile Yield (psi) | Tensile Strength (psi) | Izod Impact (ft/lbs/in) | Gardner Impact (in/lb) |
|---|---|---|---|---|---|
| MeOH pptd (prior art) | 55 | 9000 | 8000 | 2.4 | 100 |
| Acetone pptd (this invention) | 58 | 8800 | 8000 | 2.5 | 125 |

COMPARISON A

The polymerization is carried out in toluene using a cuprous bromide-dibutyl amine catalyst at a xylenol: CuBr:dibutylamine molar ratio of 100:1:12. Twenty gallons of toluene is added to a 50 gallon stirred reactor and followed by the cuprous bromide and amine. Oxygen is introduced with vigorous stirring and a solution of 17 pounds of 2,6-xylenol in 13 pounds of toluene is added over a period of approximately 30 minutes. After 2½ hours, the mixture is diluted with 10 gallons of trichloroethylene, stirred with 50% aqueous acetic acid, and filtered through a bed of Celite to remove water, copper, etc., and yield a dry solution containing approximately 7% polymer by weight. The polymer is precipitated by addition of two volumes of dry acetone and the polymer is separated on a centrifugal filter. The particles of polymer are extremely slow filtering. The product is reslurried with acetone and again filtered; the yield of polymer after drying is only 5.5 lbs.; in a similar experiment, with methanol as the precipitant, the yield is 12.5 lbs.

This demonstrates the need to use at least a minor proportion of water in the process of the present invention.

EXAMPLE 7

Polyphenylene ether reaction mixture prepared, diluted, and mixed with 20% aqueous solution of the trisodium salt of EDTA as described in Example 1 is separated in a liquid-liquid centrifuge and the lighter phase (polyphenylene ether in toluene) is concentrated under vacuum to approximately 32% polymer. A 50.00 gram portion of the mixture is precipitated with 100 ml. of acetone containing 10% by weight of water, filtered on a tared filter, washed with 90% acetone, and dried; the weight of dried polymer is 15.1926 grams. The weight of dried polymer from a second 50.00 gram portion of the mixture, precipitated and washed with methanol containing 5% water is 15.1707 grams.

This example provides further illustration that polymer recovery is not significantly reduced by precipitation with acetone-water and shows precipitation at higher polymer concentration.

EXAMPLE 8

A reaction mixture prepared as described in Example 1, 100 grams, is diluted to 16% polymer concentration and mixed with 4.4 grams sodium citrate as a 20% aqueous solution, and then stirred with 200 ml. of a solution made by mixing 10 volumes of water with 90 volumes of acetone. The result is a suspension of polymer in an acetone-toluene upper phase and a largely aqueous lower phase. The lower phase is separated in a separatory funnel and the polymer is separated from the upper phase by filtration. The filtrate contains only 8 ppm of copper, while the aqueous lower phase contains 850 ppm.

Other modifications and variations of the present invention are possible in the light of the above teach-

We claim:

1. In a process for forming a polyphenylene ether by an oxidative coupling reaction in the presence of a metal ion-amine complex catalyst comprising passing an oxygen containing gas through a reaction solution of a phenol and said metal-ion amine catalyst, the improvement which comprises separating the polyphenylene ether by admixing said solution with a mixture of acetone and a minor proportion of water.

2. A process as defined in claim 1 wherein the mixture of acetone and water comprises from about 3 to about 15% of water by weight.

3. A process as defined in claim 1 wherein a chelatable metal ion-amine complex catalyst is used and which also includes terminating the reaction and separating the metal ion component of said catalyst by contacting the reaction solution with a chelating agent prior to admixing said solution with said mixture of acetone and a minor proportion of water.

4. A process as defined in claim 3 wherein said chelating agent is a salt of ethylenediaminetetraacetic acid.

5. A process as defined in claim 3 wherein the reaction is carried out in toluene with a copper ion-amine catalyst and the polymer is precipitated and the copper ion is simultaneously separated by extraction into a largely aqueous phase which forms during the step of admixing the reaction solution and the mixture of acetone and a minor proportion of water.

6. A process as defined in claim 1 wherein the polyphenylene ether concentration in the reaction solution is at least about 15% by weight.

7. A process as defined in claim 1 wherein said polyphenylene ether is of the formula:

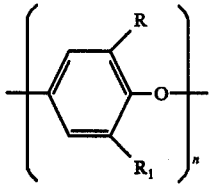

wherein the oxygen ether atom of one unit is connected to the benzene nucleus of the next adjoining unit; $n$ is an integer of at least 50; and R and $R_1$ are monovalent substituents selected from hydrogen, halogen, hydrocarbon radicals, halohydrocarbon radicals having at least 2 carbon atoms between the halogen atom and the phenyl nucleus, hydrocarbonoxy and halohydrocarbonoxy radicals having at least 2 carbon atoms between the halogen atom and the phenyl nucleus.

8. A process as defined in claim 7 wherein said polyphenylene ether is poly(2,6-dimethyl-1,4-phenylene) ether.

9. A process as defined in claim 3 wherein said chelating agent is added to the reaction solution as an aqueous solution.

10. A process as defined in claim 9 wherein tetrasodium ethylenediaminetetraacetic acid is employed.

11. A process as defined in claim 9 wherein trisodium ethylenediaminetetraacetic acid is employed.

12. A process as defined in claim 9 wherein disodium ethylenediaminetetraacetic acid is employed.

13. A process as defined in claim 9 wherein a disodium salt of nitrilotriacetic acid is employed.

14. A process as defined in claim 9 wherein a trisodium salt of nitrilotriacetic acid is employed.

15. A process as defined in claim 3 wherein the molar ratio of the salt of ethylenediaminetetraacetic acid to metal ion is from 1:1 to 10:1.

16. A process as defined in claim 1 wherein the metal ion in the complex catalyst comprises copper.

17. A process as defined in claim 3 wherein the metal ion in the complex catalyst comprises copper.

18. In a process for forming a polyphenylene ether by an oxidative coupling reaction in the presence of a copper-amine complex catalyst comprising passing an oxygen containing gas through a reaction solution of a phenol and said catalyst in toluene solvent, the improvement which comprises producing a concentration in said reaction solution of polyphenylene ether at least about 15% by weight and thereafter, separating the polyphenylene ether by admixing said solution with a mixture of acetone and water, in which the water comprises from about 3 to about 15% by weight.

19. A process as defined in claim 18 which also includes terminating the reaction and separating the copper component of the catalyst by contacting the reaction solution with a salt of ethylenediaminetetraacetic acid and thereafter admixing said solution with said mixture of acetone and water whereby a discrete aqueous phase is formed containing substantially all of the copper in the form of a chelate, separating said aqueous phase and recovering the simultaneously precipitated polyphenylene ether.

20. In a process for forming a polyphenylene ether by an oxidative coupling reaction in the presence of a metal ion-amine complex catalyst comprising passing an oxygen containing gas through a reaction solution of a phenol and said metal ion-amine catalyst, the improvement which comprises separating the polyphenylene ether by admixing said solution with a mixture of acetone and a minor proportion of water, in which the water comprises from about 3 to 49% by weight, said mixture of acetone and water being present in a proportion of from about 0.5 to 10 volumes per volume of said reaction solution.

21. In a process for forming a polyphenylene ether by an oxidative coupling reaction in the presence of a copperamine complex catalyst comprising passing an oxygen containing gas through a reaction solution of a phenol and said catalyst in toluene solvent, the improvement which comprises producing a concentration in said reaction solution of polyphenylene ether at least about 15% by weight and thereafter, separating the polyphenylene ether by admixing said solution with a mixture of acetone and water, in which the water comprises from about 3 to 49% by weight, said mixture of acetone and water being present in a proportion of from about 0.5 to 10 volumes per volume of said reaction solution.